United States Patent
Raak

(10) Patent No.: US 11,803,870 B1
(45) Date of Patent: Oct. 31, 2023

(54) HEALTH INSURANCE CARD DIGITAL WALLET GENERATION SYSTEM AND RELATED METHODS

(71) Applicant: Inmar Clearing, Inc., Winston-Salem, NC (US)

(72) Inventor: Alise Raak, Winston-Salem, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 0 days.

(21) Appl. No.: 17/876,414

(22) Filed: Jul. 28, 2022

(51) Int. Cl.
  G06Q 30/00 (2023.01)
  G06Q 30/0238 (2023.01)
  G06Q 20/36 (2012.01)
  G06Q 40/08 (2012.01)
  G06Q 30/0601 (2023.01)

(52) U.S. Cl.
  CPC ....... *G06Q 30/0238* (2013.01); *G06Q 20/363* (2013.01); *G06Q 30/0641* (2013.01); *G06Q 40/08* (2013.01)

(58) Field of Classification Search
  None
  See application file for complete search history.

(56) References Cited

U.S. PATENT DOCUMENTS

| | | | |
|---|---|---|---|
| 9,589,266 B2* | 3/2017 | Pourfallah | G06Q 20/327 |
| 9,760,871 B1 | 9/2017 | Pourfallah et al. | |
| 9,760,872 B2* | 9/2017 | Zamer | G06Q 20/08 |
| 10,223,710 B2* | 3/2019 | Purves | G06Q 20/3224 |
| 10,460,191 B1* | 10/2019 | Pribble | G06V 10/25 |
| 10,621,574 B1* | 4/2020 | Rao | G06Q 20/363 |
| 10,636,050 B1* | 4/2020 | Bartow | G06Q 20/0457 |
| 10,755,297 B1* | 8/2020 | Smith | G06Q 30/0225 |
| 10,929,841 B1* | 2/2021 | Kalaboukis | G06Q 20/322 |
| 11,501,328 B1* | 11/2022 | Sandgren | G06Q 30/0238 |
| 2008/0041940 A1* | 2/2008 | Weeks | G06K 19/0719 235/380 |
| 2012/0239417 A1* | 9/2012 | Pourfallah | G06Q 30/0601 705/2 |
| 2013/0254115 A1* | 9/2013 | Pasa | G06Q 20/367 705/67 |
| 2013/0332199 A1* | 12/2013 | Freiwat | G06Q 40/08 705/4 |
| 2014/0006277 A1* | 1/2014 | Rao | G06Q 20/3572 705/41 |

(Continued)

*Primary Examiner* — Luis A Brown
(74) *Attorney, Agent, or Firm* — ALLEN, DYER, DOPPELT, + GILCHRIST, P.A.

(57) ABSTRACT

A digital wallet generation system may include a user device associated with a given user and configured to acquire an image of a health insurance card associated with the given user. The health insurance card may have a unique identifier (UID). The system may also include a digital wallet server configured to generate a digital wallet for the given user based upon the UID, and communicate with a health insurance provider server associated with a health insurance provider to determine at least one of an available product and service provided by the health insurance provider for the benefit of the given user and paid by the health insurance provider based upon the UID. The server may also be configured to generate a digital coupon having a redeemable value redeemable toward the at least one of the available product and service, and store the digital coupon in the digital wallet.

23 Claims, 5 Drawing Sheets

(56) References Cited

U.S. PATENT DOCUMENTS

| | | | |
|---|---|---|---|
| 2016/0019530 A1* | 1/2016 | Wang | H04N 23/57 |
| | | | 705/39 |
| 2017/0061461 A1* | 3/2017 | Jajara | G06Q 20/367 |
| 2019/0236589 A1* | 8/2019 | Garrett | G06Q 20/3278 |
| 2020/0019957 A1* | 1/2020 | Bowefield | G06F 16/986 |
| 2021/0049593 A1* | 2/2021 | Smith | G06Q 20/351 |
| 2021/0152665 A1* | 5/2021 | Hart | H04W 12/06 |
| 2021/0287768 A1* | 9/2021 | Craig | G06K 7/1417 |

* cited by examiner

HEALTH INSURANCE CARD DIGITAL WALLET GENERATION SYSTEM AND RELATED METHODS

TECHNICAL FIELD

The present invention relates to the field of digital wallets, and, more particularly, to digital wallet generation based upon a health insurance card, and related methods.

BACKGROUND

A health insurance card is a card that is typically used as proof of health insurance for a given insured. A typical insurance card may include the insured's name, the name of the insured's insurance company and contact information, such as a customer service phone number, email address and website. A typical insurance card may also include the type of insurance plan (e.g., HMO, PPO, etc.), and the insured's identification or policy. A group number, copay information, and/or prescription benefits may also be included on the insurance card.

A typical health insurance card is presented to a healthcare provider and/or prescription medication provider for processing of payment and/or verification of coverages. Payments to a healthcare provider or pharmacy may be processed based upon filing of claims under the insured's name and policy and based upon information from the health insurance card.

Sales of a particular product or service may be based upon how well that product or service is marketed to a consumer. One form of marketing or promotion is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period. Other promotional terms may include companion product and purchase quantity requirements.

SUMMARY

A digital wallet generation system may include a user device associated with a given user and configured to acquire an image of a health insurance card associated with the given user. The health insurance card may have a unique identifier (UID). The digital wallet generation system may include a digital wallet server configured to generate a digital wallet for the given user based upon the UID, and communicate with a health insurance provider server associated with a health insurance provider to determine at least one of an available product and service provided by the health insurance provider for the benefit of the given user and paid by the health insurance provider based upon the UID. The digital wallet server may also be configured to generate a digital coupon having a redeemable value redeemable toward the at least one available product and service, and store the digital coupon in the digital wallet.

The digital wallet server may be configured to obtain the image of the health insurance card and perform an optical character recognition to extract the UID, for example. The user device may be configured to perform an optical character recognition to extract the UID and communicate the UID to the digital wallet server, for example.

The digital wallet server may be configured to cooperate with the user device to display a machine-readable code representative of the digital coupon for redemption at a point-of-sale (POS) terminal. The digital wallet server may be configured to cooperate with the health insurance provider server to validate the at least one of the available product and service prior to applying the redeemable value thereto, for example.

The given user may have a retailer digital wallet associated with a given retailer, and the retailer digital wallet may have a retailer user identifier associated therewith. The digital wallet server may be configured to merge the digital wallet and the retailer digital wallet based upon the UID and the retailer user identifier so that the at least one of the available product and service is redeemable at the given retailer, for example. The digital wallet server may be configured to cooperate with the health insurance provider server to process payment for the at least one of the available product and service based upon redemption of the digital coupon, for example.

A method aspect is directed to a method of generating a digital wallet. The method may include using a digital wallet server to generate a digital wallet for a given user associated based upon a unique identifier (UID) of a health insurance card. An image of the health insurance card may be obtained by a user device associated with the given user. The method may also include using the digital wallet server to communicate with a health insurance provider server associated with a health insurance provider to determine at least one of an available product and service provided by the health insurance provider for the benefit of the given user and paid by the health insurance provider based upon the UID, and generate a digital coupon having a redeemable value redeemable toward the at least one of the available product and service, and store the digital coupon in the digital wallet.

A computer readable medium aspect is directed to non-transitory computer readable medium for generating a digital wallet. The non-transitory computer readable medium includes computer executable instructions that when executed by a processor cause the processor to perform operations. The operations may include generating a digital wallet for a given user associated based upon a unique identifier (UID) of a health insurance card. An image of the health insurance card may be obtained by a user device associated with the given user. The operations may include communicating with a health insurance provider server associated with a health insurance provider to determine at least one of an available product and service provided by the health insurance provider for the benefit of the given user and paid by the health insurance provider based upon the UID. The operations may also include generating a digital coupon having a redeemable value redeemable toward the at least one available product and service, and store the digital coupon in the digital wallet.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
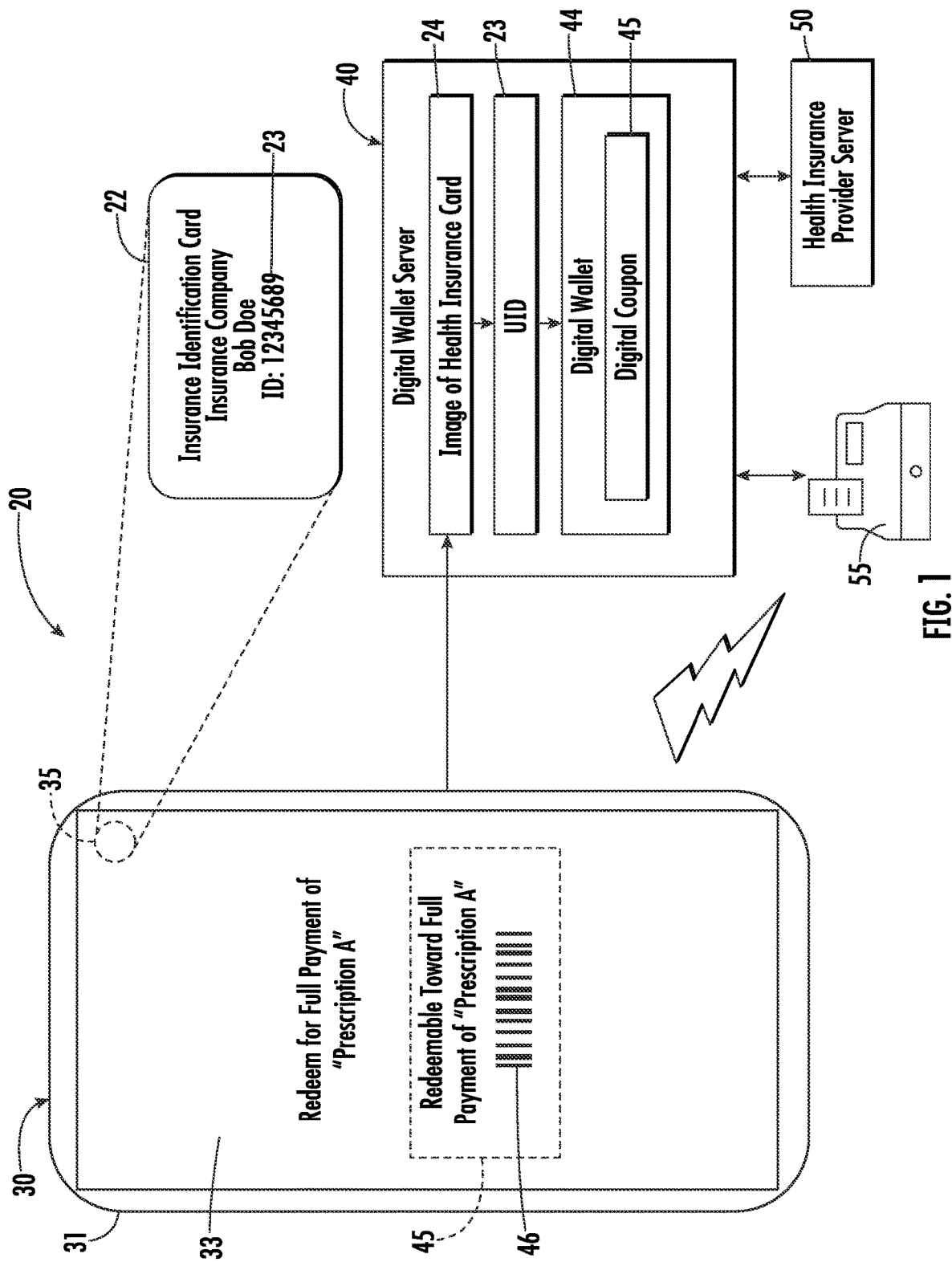
FIG. 1 is a schematic diagram of a digital wallet generation system in accordance with an embodiment.
Figure 2:
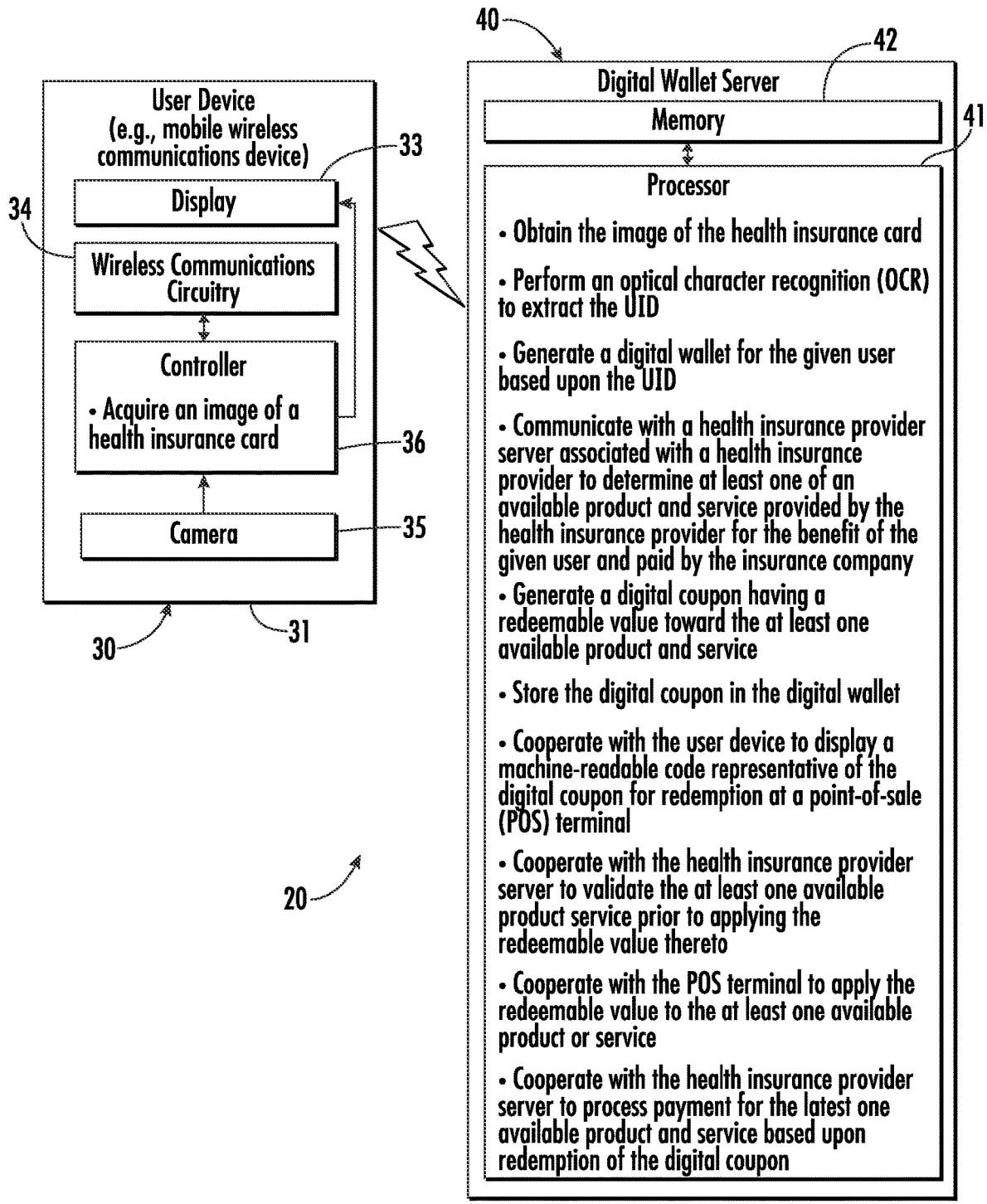
FIG. 2 is a schematic block diagram of a portion of the digital wallet generation system of FIG. 1.

Referring initially to FIGS. 1-2, a digital wallet generation system 20 includes a user device 30 associated with a given user. The user device 30 is illustratively in the form of a mobile wireless communications device, and more particularly, a mobile phone or smartphone, and includes a display 33, for example, a touch display, carried by housing 31, for example, a portable housing. Wireless communications circuitry 34 and a camera 35 are also carried by the housing 31. A controller 36 is coupled to the display 33, the wireless communications circuitry 34, and the camera 35. The user device 30 may be another type of device, for example, a tablet computer, personal computer, or wearable device.

The user device 30, for example, via the controller 36, acquires an image 24 of a health insurance card 22. More particularly, the user device 30 may operate the camera 35 to acquire the image of the health insurance card 24, for example, by placing the health insurance card 22 within the field of view of the camera and providing input to the user device (e.g., via the touch display), to acquire the image. The health insurance card 22 is associated with the given user. The health insurance card 22 includes, for example, printed thereon, a unique identifier 23 that identifies the given user to health care providers along with insurance information, for example, coverage. Additional information may be printed on the health insurance card 22 and acquired as part of the image 24.

The digital wallet generation system 20 also includes a digital wallet server 40. The digital wallet server 40 includes a processor 41 and a memory 42 cooperating therewith. While operations of the digital wallet server 40 are described herein, it should be appreciated that the operations are performed based upon cooperation between the processor 41 and the memory 42.

Referring now additionally to the flowchart 60 in FIG. 3, beginning at Block 62, operations of the digital wallet server 40 will now be described. The digital wallet server 40, at Block 64, obtains the image of health insurance card 24. For example, the digital wallet server 40 may retrieve the image of the health insurance card 24 from the user device 30, or the user device may communicate the image of the health insurance card to the digital wallet server. The digital wallet server 40, at Block 66, performs an optical character recognition to extract the UID 23.

Figure 4:
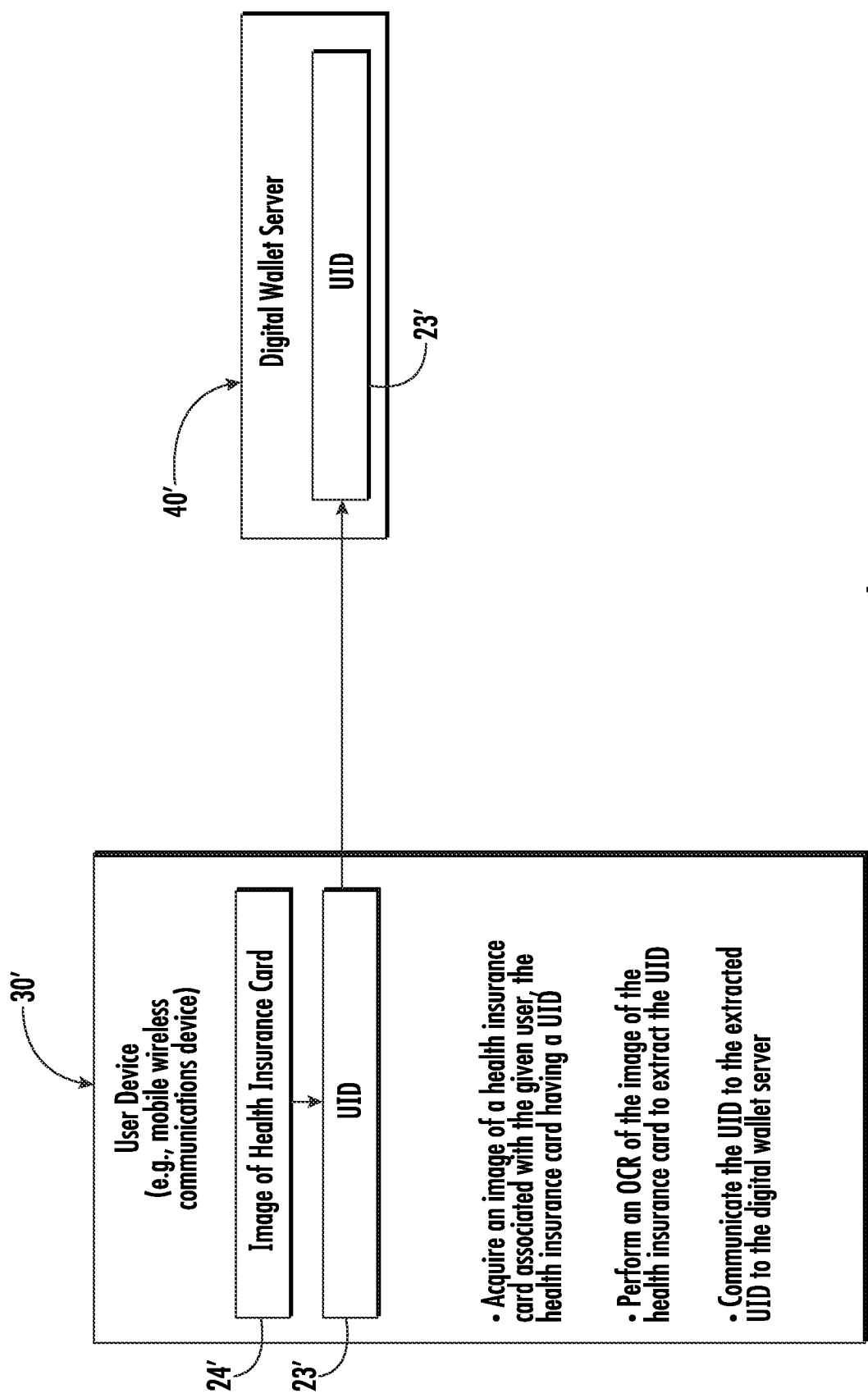
FIG. 4 is a schematic diagram of a portion of a digital wallet generation system in accordance with another embodiment.

Referring briefly to FIG. 4, in another embodiment, the user device 30' may perform optical character recognition to extract the UID 23' from the image of the health insurance card 24'. The user device 30' may thus communicate the extracted UID 23' to the digital wallet server 40'. Continued operations of the digital wallet server 40' will be described below.

Figure 3:
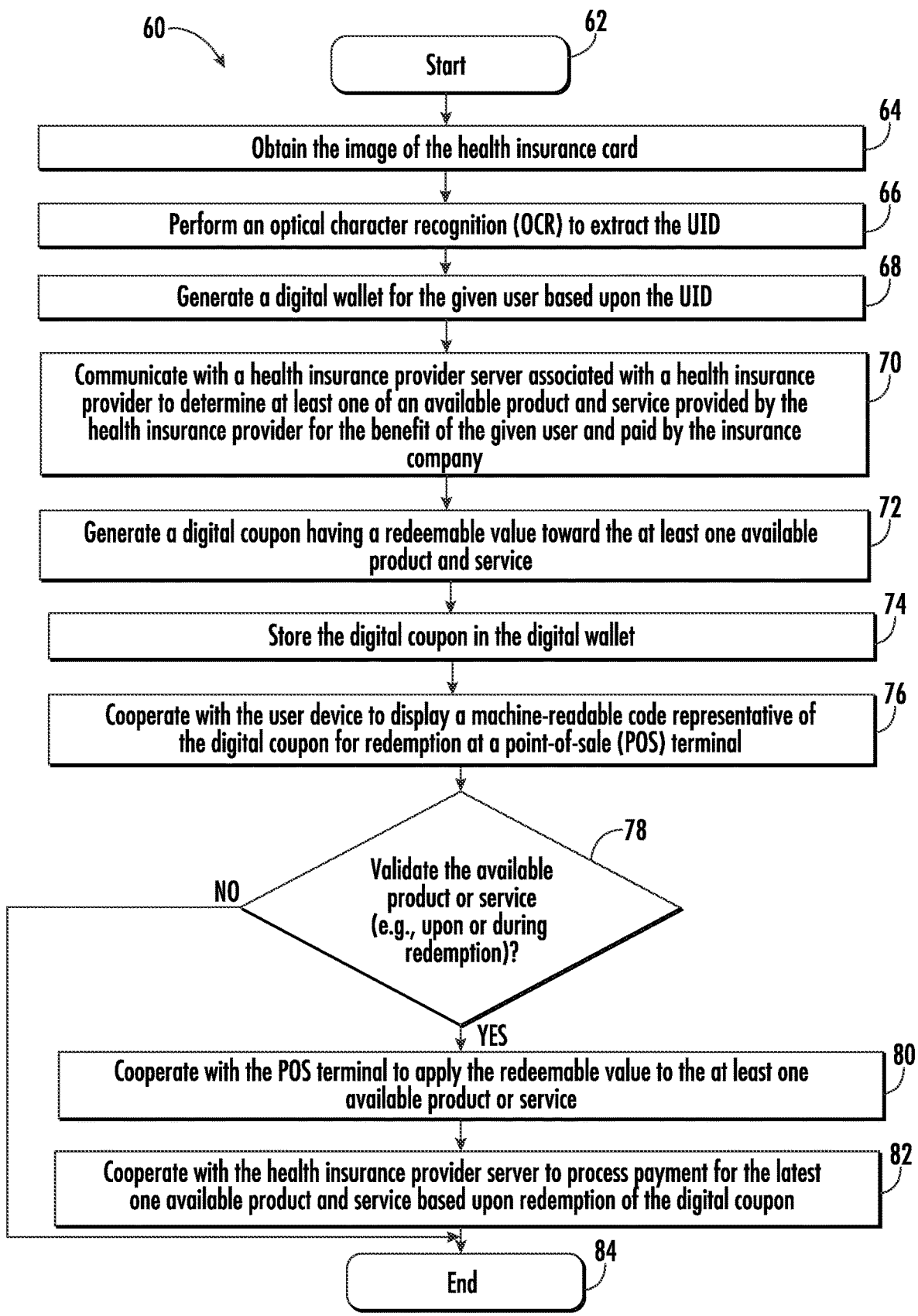
FIG. 3 is a flow diagram illustration operation of the digital wallet generation server of FIG. 2.

Referring again to FIGS. 1-2, and the flowchart 60 in FIG. 3, at Block 68, the digital wallet server 40 generates a digital wallet 44 for the given user based upon the UID 23. More particularly, the digital wallet server 40 generates a digital wallet associated or identified by the UID.

The digital wallet server 40 communicates with a health insurance provider server 50 associated with a health insurance provider to determine one or more available products and services provided by the health insurance provider and paid by the insurance provider. (Block 70). More particularly, the digital wallet server 40 communicates the UID 23 to the health insurance provider server 50 for determining the products and/or services provided by the health insurance provider and paid by the insurance provider. The digital wallet server 40 may obtain a listing of the available products or services provided by the health insurance provider and paid by the insurance provider from the health insurance provider server 50. The digital wallet server 40 may alternatively or additionally query the health insurance provider server 50 with one or more products and services (e.g., by way of codes) along with the UID 23 to obtain validation for certain products and/or services, for example, available to the given user.

At Block 72, the digital wallet server 40 generates a digital coupon 45. The digital coupon 45 has a redeemable value that is redeemable toward one or more of the available products and services. For example, the digital coupon 45 may have a redeemable value that matches or is equal to the amount of a prescription medication (e.g., copay and/or price paid by the health insurance provider). The digital wallet server 40 may generate a unique digital coupon identifier that is associated with the redemption value and the corresponding product or service. At Block 74, the digital wallet server 40 stores the digital coupon 45 in the digital wallet 44 of the given user, for example, based upon the UID 23.

The digital wallet server 40 cooperates with the user device 30 to display a machine readable code 46 that is representative of the digital coupon 45 (Block 76). For example, upon or when the given user is ready to redeem the digital coupon 45, the digital wallet server 40 may instruct the user device 30, upon display of the digital coupon on the display 33 of the user device to display the digital coupon as a barcode, quick-response (QR) code, or other machine readable code. The machine readable code 46 may be scanned by a point-of-sale (POS) terminal 55, via the display 33 of the user device 30 upon redemption of the digital coupon 45 at the POS terminal.

At Block 78, the digital wallet server 40 cooperates with the health insurance provider server 50 to validate the products and/or services, for example, associated with the digital coupon 45. The digital wallet server 40 may perform this validation prior to cooperating, for example, with the POS terminal 55 and/or the health insurance provider server 50, for redemption of the digital coupon 45. The validation may occur similarly to validating a pharmacy claim or coverage of a particular product or service with the health insurance provider, for example, by communicating a validation request from the digital wallet server 40 to the health insurance provider server 50. The digital wallet server 40 may set a validation flag upon validation that may be checked prior to permitting redemption.

The given user, for example, may wish to apply the digital coupon 45 to a medication or vaccination at a store, for example, a retail store, such as a grocery store with a pharmacy, that may provide healthcare services. Upon checkout in the case of a medication, or prior to providing the healthcare service, the given user may present the digital coupon 45 at the POS terminal 55, for example, collocated where the product or service is provided. The given user may display for scanning at the POS terminal 55, the digital coupon 45, the corresponding product or service associated therewith may then be validated as described above.

If, at Block 78, the product and/or service is validated, the digital wallet server 40 may cooperate with the POS terminal 55 to apply the digital coupon 45 as a form of payment or discount (e.g., for the entire amount of the product and/or service, covered amount, and/or copay) (Block 80). The POS terminal 55 processes, via cooperation with the digital wallet server 40, the digital coupon 45 similarly to any other digital coupon redeemable for a product or service, such as, for example, when the POS terminal is located at a grocery store, a coupon for a discount off a food item.

Also, if at Block 78, the product and/or service is validated, the digital wallet server 40 cooperates with the health insurance provider server 50 to process payment for the corresponding product and/or service (Block 82). For example, the digital wallet server 40 may maintain an accounting and process or initiate electronic funds transfers from the health insurance provider. If, at Block 78, the product is not validated, operations end at Block 84.

More particularly, with respect to redemption and processing of payment, the POS terminal 55 may communicate the identifier associated with the digital coupon 45 to the digital wallet server 40 for redemption. The digital wallet server 40 may perform its own validation for redemption, for example, similar to the validation techniques described above. The digital wallet server 40, at Block 82, upon redemption, cooperates with the health insurance provider server 50 to process payment for the product and/or service corresponding to the digital coupon 45. More particularly, the digital wallet server 40 may process payment, for example, as an intermediary, from the healthcare provider to the entity associated with the POS terminal 55, for example, a pharmacy, grocery store, or physician's office. In some embodiments, payment may be processed upon generation of the digital coupon 45 rather than redemption. Operations end at Block 84.

Figure 5:
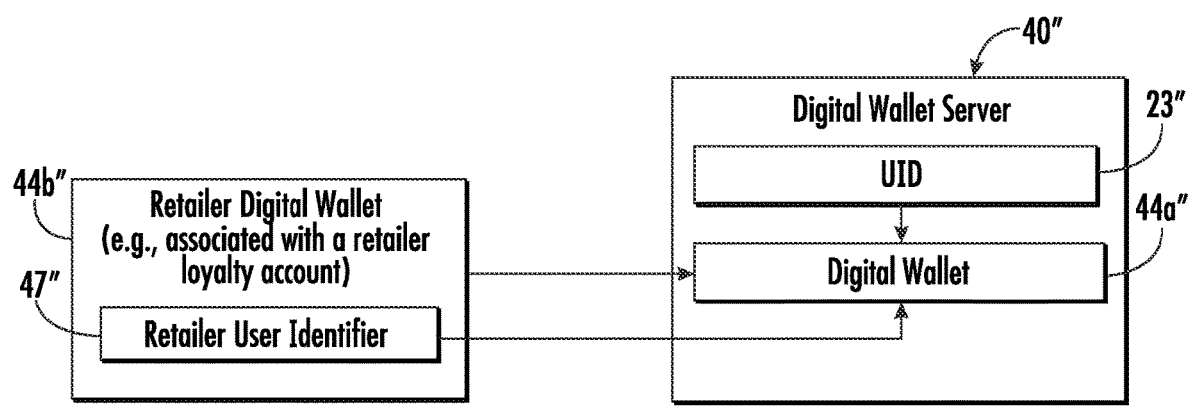
FIG. 5 is a schematic diagram of a portion of a digital wallet generation system in accordance with another embodiment.

Referring briefly to FIG. 5, in another embodiment, the given user has a retailer digital wallet 44b" associated with a given retailer. The retailer digital wallet 44b" may be, for example, associated with a retailer loyalty account, and may have a retailer user identifier 47" associated therewith. The digital wallet server 40" merges the digital wallet 44a" and the retailer digital wallet 44b" based upon the UID 23" and the retailer user identifier 47" so that the available products and/or services are redeemable at the given retailer, for example, by way of the retailer digital wallet or loyalty program. For example, digital coupons from the retailer for food items may appear in the same, combined, digital wallet as the available products and/or services provided by the health insurance provider.

As will be appreciated by those skilled in the art, the digital wallet generation system 20 described herein may be particularly advantageous as it permits credits or other covered products and/or services that would otherwise be paid by the healthcare provider to the service provider, for example, by way of filing an insurance claim, to be processed relatively easily as a digital coupon. Moreover, the digital wallet generation system 20 advantageously conceptually permits the given user's insurance card to be converted to a digital coupon or a payment card.

A method aspect is directed to a method of generating a digital wallet 44. The method includes using a digital wallet server 40 to generate a digital wallet for a given user associated based upon a unique identifier (UID) 23 of a health insurance card 22. An image of the health insurance card 24 may be obtained by a user device 30 associated with the given user. The method also includes using the digital wallet server 40 to communicate with a health insurance provider server 50 associated with a health insurance provider to determine at least one of an available product and service provided by the health insurance provider for the benefit of the given user and paid by the health insurance provider, and generate a digital coupon 45 having a redeemable value redeemable toward the at least one of the available product and service, and store the digital coupon in the digital wallet 44.

A computer readable medium aspect is directed to non-transitory computer readable medium for generating a digital wallet 44. The non-transitory computer readable medium includes computer executable instructions that when executed by a processor 41 cause the processor to perform operations. The operations include generating a digital wallet 44 for a given user associated based upon a unique identifier (UID) 23 of a health insurance card 22. An image of the health insurance card 24 may be obtained by a user device 30 associated with the given user. The operations also include communicating with a health insurance provider server 50 associated with a health insurance provider to determine at least one of an available product and service provided by the health insurance provider for the benefit of the given user and paid by the health insurance provider. The operations also include generating a digital coupon 45 having a redeemable value redeemable toward the at least one available product and service, and store the digital coupon in the digital wallet 44.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:
1. A digital wallet generation system comprising:
a point-of-sale (POS) terminal associated with a given retailer;
a user device associated with a given user and configured to acquire an image of a health insurance card associated with the given user, the health insurance card having a unique identifier (UID) for identifying the given user to a health insurance provider and for identifying at least one of an available product and service payable by the health insurance provider through an insurance claim; and
a digital wallet server configured to obtain the image of the health insurance card and perform an optical character recognition to extract the UID, generate a digital wallet for the given user based upon the UID, the digital wallet for storing digital coupons redeemable toward products for purchase at the given retailer, communicate with a health insurance provider server associated with the health insurance provider to determine the at least one of the available product and service payable by the health insurance provider for the benefit of the given user based upon the UID, generate a digital coupon having a redeemable value redeemable toward the at least one available product and service, and store the digital coupon in the digital wallet for redemption at the given retailer so that the at least one available product and service that is otherwise payable via the insurance claim is payable at the POS terminal via the digital coupon, generate a unique digital coupon identifier (UDCI) associated with the redemption value and the corresponding at least one available product and service, and cooperate with the POS terminal to redeem the digital coupon at the POS terminal based upon the UDCI and similarly to any other digital coupon redeemable for another at least one product and service at the given retailer.

2. The digital wallet generation system of claim 1 wherein the digital wallet server is configured to cooperate with the user device to display a machine-readable code representative of the digital coupon for redemption at the POS terminal.

3. The digital wallet generation system of claim 1 wherein the digital wallet server is configured to cooperate with the health insurance provider server to validate the at least one of the available product and service prior to applying the redeemable value thereto.

4. The digital wallet generation system of claim 1 wherein the given user has a retailer digital wallet associated with a given retailer, the retailer digital wallet having a retailer user identifier associated therewith; and wherein the digital wallet server is configured to merge the digital wallet and the retailer digital wallet based upon the UID and the retailer user identifier so that the at least one of the available product and service is redeemable at the given retailer.

5. The digital wallet generation system of claim 1 wherein the digital wallet server is configured to cooperate with the health insurance provider server to process payment for the at least one of the available product and service based upon redemption of the digital coupon.

6. A digital wallet server comprising:
a processor cooperating with a memory to
obtain an image of a health insurance card from a user device associated with a given user, and perform an optical character recognition to extract a unique identifier (UID), the UID for identifying the given user to a health insurance provider and for identifying at least one of an available product and service payable by the health insurance provider through an insurance claim, generate a digital wallet for the given user based upon the UID, the digital wallet for storing digital coupons redeemable toward products for purchase at a given retailer, communicate with a health insurance provider server associated with the health insurance provider to determine the at least one of the available product and service payable by the health insurance provider for the benefit of the given user based upon the UID, generate a digital coupon having a redeemable value redeemable toward the at least one of the available product and service, and store the digital coupon in the digital wallet for redemption at the given retailer so that the at least one available product and service that is otherwise payable via the insurance claim is payable via the digital coupon at a point-of-sale (POS) terminal associated with the given retailer, generate a unique digital coupon identifier (UDCI) associated with the redemption value and the corresponding at least one available product and service, and cooperate with the POS terminal to redeem the digital coupon at the POS terminal based upon the UDCI and similarly to any other digital coupon redeemable for another at least one product and service at the given retailer.

7. The digital wallet server of claim 6 wherein the processor is configured to cooperate with the user device to display a machine-readable code representative of the digital coupon for redemption at the POS terminal.

8. The digital wallet server of claim 6 wherein the processor is configured to cooperate with the health insurance provider server to validate the at least one of the available product and service prior to applying the redeemable value thereto.

9. The digital wallet server of claim 6 wherein the given user has a retailer digital wallet associated with a given retailer, the retailer digital wallet having a retailer user identifier associated therewith; and wherein the processor is configured to merge the digital wallet and the retailer digital wallet based upon the UID and the retailer user identifier so that the at least one of the available product and service is redeemable at the given retailer.

10. A method of generating a digital wallet comprising:
using a digital wallet server to
obtain an image of a health insurance card from a user device associated with a given user, and perform an optical character recognition to extract a unique identifier (UID), the UID for identifying the given user to a health insurance provider and for identifying at least one of an available product and service payable by the health insurance provider through an insurance claim, generate a digital wallet for the given user based upon the UID, the digital wallet for storing digital coupons redeemable toward products for purchase at a given retailer, communicate with a health insurance provider server associated with the health insurance provider to determine the at least one of the available product and service payable by the health insurance provider for the benefit of the given user based upon the UID, generate a digital coupon having a redeemable value redeemable toward the at least one of the available product and service, and store the digital coupon in the digital wallet for redemption at the given retailer so that the at least one available product and service that is otherwise payable via the insurance claim is payable via the digital coupon at a point-of-sale (POS) terminal associated with the given retailer, generate a unique digital coupon identifier (UDCI) associated with the redemption value and the corresponding at least one available product and service, and cooperate with the POS terminal to redeem the digital coupon at the POS terminal based upon the UDCI and similarly to any other digital coupon redeemable for another at least one product and service at the given retailer.

11. The method of claim 10 wherein using the digital wallet server comprises using the digital wallet server to cooperate with the health insurance provider server to validate the at least one of the available product and service prior to applying the redeemable value thereto.

12. The method of claim 10 wherein the given user has a retailer digital wallet associated with a given retailer, the retailer digital wallet having a retailer user identifier associated therewith; and wherein using the digital wallet server comprises using the digital wallet server to merge the digital wallet and the retailer digital wallet based upon the UID and the retailer user identifier so that the at least one of the available product and service is redeemable at the given retailer.

13. A non-transitory computer readable medium for generating a digital wallet, the non-transitory computer readable medium comprising computer executable instructions that when executed by a processor cause the processor to perform operations comprising:

obtaining an image of a health insurance card from a user device associated with a given user, and performing an optical character recognition to extract a unique identifier (UID), the UID for identifying the given user to a health insurance provider and for identifying at least one of an available product and service payable by the health insurance provider through an insurance claim;

generating a digital wallet for the given user based upon the UID, the digital wallet for storing digital coupons redeemable toward products for purchase at a given retailer;

communicating with a health insurance provider server associated with the health insurance provider to determine the at least one of the available product and service payable by the health insurance provider for the benefit of the given user based upon the UID;

generating a digital coupon having a redeemable value redeemable toward the at least one available product and service, and store the digital coupon in the digital wallet for redemption at the given retailer so that the at least one available product and service that is otherwise payable via the insurance claim is payable via the digital coupon at a point-of-sale (POS) terminal associated with the given retailer;

generating a unique digital coupon identifier (UDCI) associated with the redemption value and the corresponding at least one available product and service, and cooperating with the POS terminal to redeem the digital coupon at the POS terminal based upon the UDCI and similarly to any other digital coupon redeemable for another at least one product and service at the given retailer.

14. The non-transitory computer readable medium of claim 13 wherein the given user has a retailer digital wallet associated with a given retailer, the retailer digital wallet having a retailer user identifier associated therewith; and wherein the operations comprise merging the digital wallet and the retailer digital wallet based upon the UID and the retailer user identifier so that the at least one of the available product and service is redeemable at the given retailer.

15. A digital wallet generation system comprising:

a point-of-sale (POS) terminal associated with a given retailer;

a digital wallet server; and a user device associated with a given user and configured to acquire an image of a health insurance card associated with the given user, the health insurance card having a unique identifier (UID) for identifying the given user to a health insurance provider and for identifying at least one of an available product and service payable by the health insurance provider through an insurance claim, and perform an optical character recognition to extract the UID and communicate the UID to the digital wallet server; and the digital wallet server configured to obtain the image of the health insurance card and perform an optical character recognition to extract the UID, generate a digital wallet for the given user based upon the UID, the digital wallet for storing digital coupons redeemable toward products for purchase at the given retailer, communicate with a health insurance provider server associated with the health insurance provider to determine the at least one of the available product and service payable by the health insurance provider for the benefit of the given user based upon the UID, generate a digital coupon having a redeemable value redeemable toward the at least one available product and service, and store the digital coupon in the digital wallet for redemption at the given retailer so that the at least one available product and service that is otherwise payable via the insurance claim is payable at the POS terminal via the digital coupon, generate a unique digital coupon identifier (UDCI) associated with the redemption value and the corresponding at least one available product and service, and cooperate with the POS terminal to redeem the digital coupon at the POS terminal based upon the UDCI and similarly to any other digital coupon redeemable for another at least one product and service at the given retailer.

16. The digital wallet generation system of claim 15 wherein the digital wallet server is configured to cooperate with the user device to display a machine-readable code representative of the digital coupon for redemption at the POS terminal.

17. The digital wallet generation system of claim 15 wherein the digital wallet server is configured to cooperate with the health insurance provider server to validate the at least one of the available product and service prior to applying the redeemable value thereto.

18. The digital wallet generation system of claim 15 wherein the given user has a retailer digital wallet associated with a given retailer, the retailer digital wallet having a retailer user identifier associated therewith; and wherein the digital wallet server is configured to merge the digital wallet and the retailer digital wallet based upon the UID and the retailer user identifier so that the at least one of the available product and service is redeemable at the given retailer.

19. The digital wallet generation system of claim 15 wherein the digital wallet server is configured to cooperate with the health insurance provider server to process payment for the at least one of the available product and service based upon redemption of the digital coupon.

20. A digital wallet server comprising:
a processor cooperating with a memory to
receive a unique identifier (UID) from a user device associated with a given user, the UID extracted by the user device based upon performing an optical character recognition, the UID for identifying the given user to a health insurance provider and for identifying at least one of an available product and service payable by the health insurance provider through an insurance claim,
generate a digital wallet for the given user based upon the UID, the digital wallet for storing digital coupons redeemable toward products for purchase at a given retailer,
communicate with a health insurance provider server associated with the health insurance provider to determine the at least one of the available product and service payable by the health insurance provider for the benefit of the given user based upon the UID,
generate a digital coupon having a redeemable value redeemable toward the at least one of the available product and service, and store the digital coupon in the digital wallet for redemption at the given retailer so that the at least one available product and service that is otherwise payable via the insurance claim is payable via the digital coupon at a point-of-sale (POS) terminal associated with the given retailer,
generate a unique digital coupon identifier (UDCI) associated with the redemption value and the corresponding at least one available product and service, and
cooperate with the POS terminal to redeem the digital coupon at the POS terminal based upon the UDCI and similarly to any other digital coupon redeemable for another at least one product and service at the given retailer.

21. The digital wallet server of claim 20 wherein the processor is configured to cooperate with the user device to display a machine-readable code representative of the digital coupon for redemption at the POS terminal.

22. The digital wallet server of claim 20 wherein the processor is configured to cooperate with the health insurance provider server to validate the at least one of the available product and service prior to applying the redeemable value thereto.

23. The digital wallet server of claim 20 wherein the given user has a retailer digital wallet associated with a given retailer, the retailer digital wallet having a retailer user identifier associated therewith; and wherein the processor is configured to merge the digital wallet and the retailer digital wallet based upon the UID and the retailer user identifier so that the at least one of the available product and service is redeemable at the given retailer.

* * * * *